United States Patent [19]
Rinehart

[11] 3,751,152
[45] Aug. 7, 1973

[54] MICROFILM READER APPARATUS WITH AUTOMATIC UPDATING DISPLAY MEANS

[75] Inventor: Louis P. Rinehart, Los Altos, Calif.

[73] Assignee: R. A. Morgan Co., Inc., Palo Alto, Calif.

[22] Filed: Feb. 22, 1971

[21] Appl. No.: 117,521

[52] U.S. Cl. .......... 353/26, 340/172.5, 340/173 LT, 353/27

[51] Int. Cl. .......... G03b 23/08, G03b 23/12

[58] Field of Search .......... 340/172.5, 173 LT, 340/173 LM; 355/46, 40; 353/25, 26, 27

[56] References Cited

UNITED STATES PATENTS 3,620,623 11/1971 Reams et al. .......... 355/46
3,290,987 12/1966 James et al. .......... 353/26
3,183,765 5/1965 Offensend et al. .......... 353/26

*Primary Examiner*—Louis R. Prince
*Assistant Examiner*—Steven L. Stephan
*Attorney*—Nilsson, Robbins, Wills & Berliner

[57] ABSTRACT

A microfilm reader system for simultaneously scanning a first strip of film, containing a first set of data photographically stored thereupon, and a second strip of film, containing a second set of data for updating certain portions of the data stored on the first film, to locate a particular image on each film and then preferentially display one of the images. The system includes electronic data handling apparatus for enabling the automatic selection and display of a particular image in response to a particular input address signal.

7 Claims, 7 Drawing Figures

INVENTOR
LOUIS P. RINEHART
BY
Lowhurst & Hamrick
ATTORNEYS

INVENTOR
LOUIS P. RINEHART
BY
Lowhurst & Hamrick
ATTORNEYS

INVENTOR

LOUIS P. RINEHART

BY

Lowhurst & Hamrick

ATTORNEYS

MICROFILM READER APPARATUS WITH AUTOMATIC UPDATING DISPLAY MEANS

BACKGROUND OF THE INVENTION

1. Field of the Invention

The present invention relates generally to microfilm readers and more particularly to a novel microfilm reader system which enables data stored on microfilm to be periodically updated and the most recent data corresponding to a particular input signal preferentially displayed in response to an input of that address signal to the system.

2. Description of the Prior Art

One of the problems encountered in the use of microfilm as a means for storing large quantities of data, which may change from time to time, is how such data may be updated as changes occur. For example, if each page of a phone book, parts catalog, or other lengthy document, or collection of data were to be microfilmed and the images grouped in some fashion along a long strip of storage film to facilitate selective location and readout, it would be unreasonably expensive to prepare a new storage film each time changes were made to a given page of the stored data. It has, for example, been found much more economical to periodically produce a second "update" film having a much smaller storage capacity, with such film containing only data corresponding to the updated pages. This data is then displayed in place of the outdated data. The problem, however, is to provide a system which is capable of making a high speed determination as to the status of the stored data so that only the most recent data is displayed.

Various attempts have been made in the prior art to provide updatable microfilm reader apparatus. Notable among these attempts are the microfilm reading devices disclosed in the U.S. Pat. to Hall Nos. 3,068,747, Offensend et al. 3,183,765 and Carlson 3,319,518. These devices, however, although including means for enabling the updating of data stored on microfilm, still do not provide apparatus which is readily suitable for modern high speed reader applications.

SUMMARY OF THE INVENTION

In accordance with the present invention, a microfilm reader system is provided for simultaneously scanning a storage filmstrip and an update filmstrip, in response to an input address signal, to locate images on each filmstrip corresponding to that particular address signal and then preferentially display one of those images. The system includes a pair of film transport and image projection mechanisms, one for accommodating the storage filmstrip and one for accommodating the update filmstrip, and an electronic control sub-system which, in response to the input address signal, drives each transport mechanism to locate a particular frame of data contained on the filmstrips. The control subsystem, upon determining that an image frame corresponding to the address signal exists on each filmstrip, causes the image contained on the update filmstrip to be displayed instead of the image contained on the storage filmstrip. However, if no image frame corresponding to the address signal appears on the update filmstrip, then the corresponding image frame on the storage filmstrip is displayed.

In the disclosed preferred embodiment, the control subsystem includes a keyboard for receiving the address signals, and immediately starts its control function upon receiving the first of several keyed-in signals forming a given address signal. This feature enables the system to perform a substantial portion of the filmstrip frame locating function during the time that the operator is inputting an address signal into the system. Accordingly, the speed of operation is substantially enhanced.

Other features and advantages of the present invention will become apparent to those skilled in the art after having read the following disclosure of the preferred embodiments which is illustrated in the several figures of the drawing.

IN THE DRAWING

DETAILED DESCRIPTION OF A PREFERRED EMBODIMENT

In microfilm storage systems, large quantities of data in the form of photographic images are usually photographically reduced to suitable "microfilm" size and then disposed in some fashion along a strip of film which can be scanned to locate a particular image so that that image can be optically "read," or displayed by projection onto a viewing screen. In accordance with one embodiment of the present invention, the various images are segregated into groups of images known in the art as microfiche and the microfiche are serially positioned along a strip of large width storage film. Each microfiche is then assigned a particular identifying code and each frame is identified by its position in the fiche. This, of course, facilitates rapid location of selected data.

Figure 1:
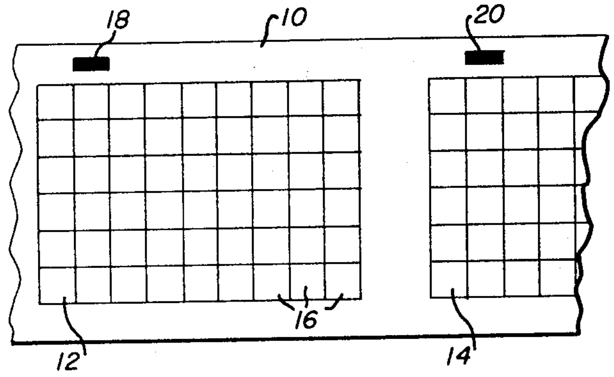
FIG. 1 shows a segment of a large size storage filmstrip having data photographically arrayed thereon in accordance with the present invention.

In FIG. 1 of the drawing, a segment of such film is illustrated. Disposed upon the filmstrip 10 are a plurality of microfiches 12 and 14 with each fiche containing a predetermined number of microfilm image bearing frames 16 arranged in rows and columns. Positioned somewhere upon filmstrip 10 proximate each fiche is a fiche indicator symbol or registration mark, such as that shown at 18 and 20, which is used to identify each fiche. Although the simple indicator symbols 18 and 20 are used in the preferred embodiment, it will be appreciated that more elaborate machine readable codes could likewise be provided to uniquely identify each fiche. By providing some means for detecting the marks 18 and 20, a particular fiche contained on filmstrip 10 can be located and a particular image frame 16 in the selected fiche can be chosen for display by selecting the row and column describing its location in the fiche. The selected image can then be optically projected onto a viewing screen or other means for readout.

It will be immediately apparent that since an extremely large number of photographic image frames can be stored in this manner upon a roll of large width film, the cost of reproducing the entire film to update certain ones of the images stored thereon would be prohibitively expensive Even if one were to physically excise from the storage film the fiche requiring change, and then splice in a new, corrected fiche, the time required to reassemble the new fiche, as well as the time required to perform the excision and splicing operation on the filmstrip would not make such practice practical, especially where the stored data frequently changes and requires periodic updating. It has been found much more practical to provide a second strip of inexpensive smaller size film which contains only the data that has been changed and then use this smaller film strip to display the new image in place of the original image contained on the larger film.

Figure 2:
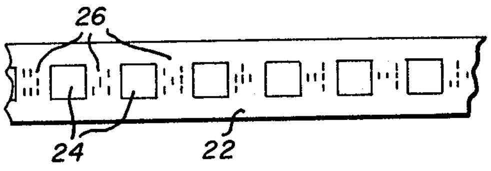
FIG. 2 shows a segment of a small size update filmstrip having data photographically disposed thereon in serial fashion in accordance with the present invention.

In FIG. 2 of the drawing, a preferred embodiment of the second filmstrip or "update" film is illustrated. The update filmstrip 22 has photographically disposed upon it in serial array, a plurality of image frames 24 separated by spaces containing a suitable form of encoding indicia 26 which uniquely identifies in machine language the location of the corresponding image frame on the storage film 10. The filmstrip 22 contains only those image frames appearing on filmstrip 10 which have been in some way changed since the storage film was initially prepared. Update filmstrip 22 is generally much smaller in size and storage capacity than is filmstrip 10. By way of example, filmstrip 10 might be 800mm film while the filmstrip 22 might be of 8mm film size. As another example, filmstrip 10 might be 105mm while filmstrip 22 might be of the 16mm film size. The relative film sizes are, of course, chosen to suit the particular application and have no fixed relationship.

Figure 3:
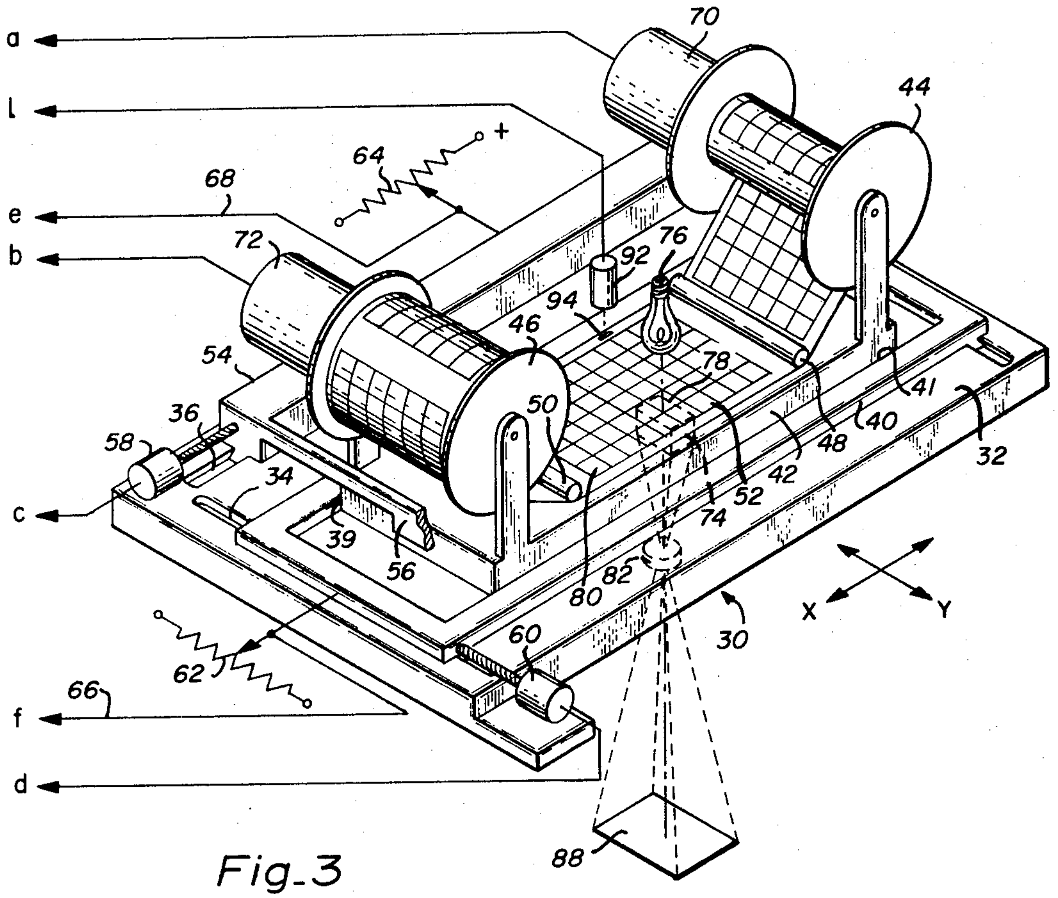
FIG. 3 is an illustration of a storage film transport and image projection mechanism in accordance with the present invention.

Referring now to FIG. 3 of the drawing, a storage film transport and image projection mechanism 30 in accordance with a preferred embodiment of the present invention is illustrated. Mechanism 30 includes a base 32 having three slots 34, 36 and 38 cut therein along three edges. Slidably positioned upon the upper surface of base 32 is a Y-axis actuator 40 having guide projections (not shown) extending into slots 34 and 38 so as to cause actuator 40 to be slidable only in the indicated "Y" direction. Also slidably disposed upon the upper surface of base 32 with two of its sides engaging actuator 40 at 39 and 41 respectively, is a film transport platform 42 having a pair of film spools 44 and 46 rotatably mounted at opposite ends thereof, along with a pair of guide rollers 48 and 50 over which the filmstrip 52 is stretched. Spool 44 is driven by a motor 70 and spool 46 is driven by a motor 72. Also mounted upon base 32 is an X-axis actuator 54 having projections (not shown) extending into slot 36 for limiting its path of movement to the "X" direction. Actuator 54 includes a pair of arms 56 which slidably engage both ends of platform 42 for moving it over the surface of base 32 within the frame 40.

Actuator 40 is moved in the "Y" direction by suitable electrically responsive drive means, such as the illustrated motor 60, which is fixed to base 32 and turns a threaded shaft into mating threads in actuator 40 for moving it as indicated. Likewise, movement of actuator 54 is effected by a motor 58 mounted to base 32 and which also turns a threaded shaft into actuator 54 for moving it in the "X" direction. In order to provide output signals corresponding to the position of actuators 40 and 54, which may be used to determine which image frame is positioned for projection, a pair of position responsive signal generators, such as the potentiometers 62 and 64, are provided with the wipers thereof being affixed to actuators 40 and 54 respectively. These devices provide at the terminals 66 and 68 respectively, electrical signals proportional to the "X" and "Y" positions of platform 42.

Disposed in fixed relationship with base 32 and directly above a rectangular aperture 74 in base 32 (shown in broken lines) is a light source 76 for illuminating one of the frames 78 in the fiche 80 to project the image contained therein through a suitable lens means 82 onto a viewing screen 88, as will be explained more fully below. Also positioned above filmstrip 52, but carried by movable platform 42, is a photocell 92 or other sensing means for sensing the registration marks 94 which appear at the edge of film strip 52 adjacent each fiche.

Figures 4, 6, 7:
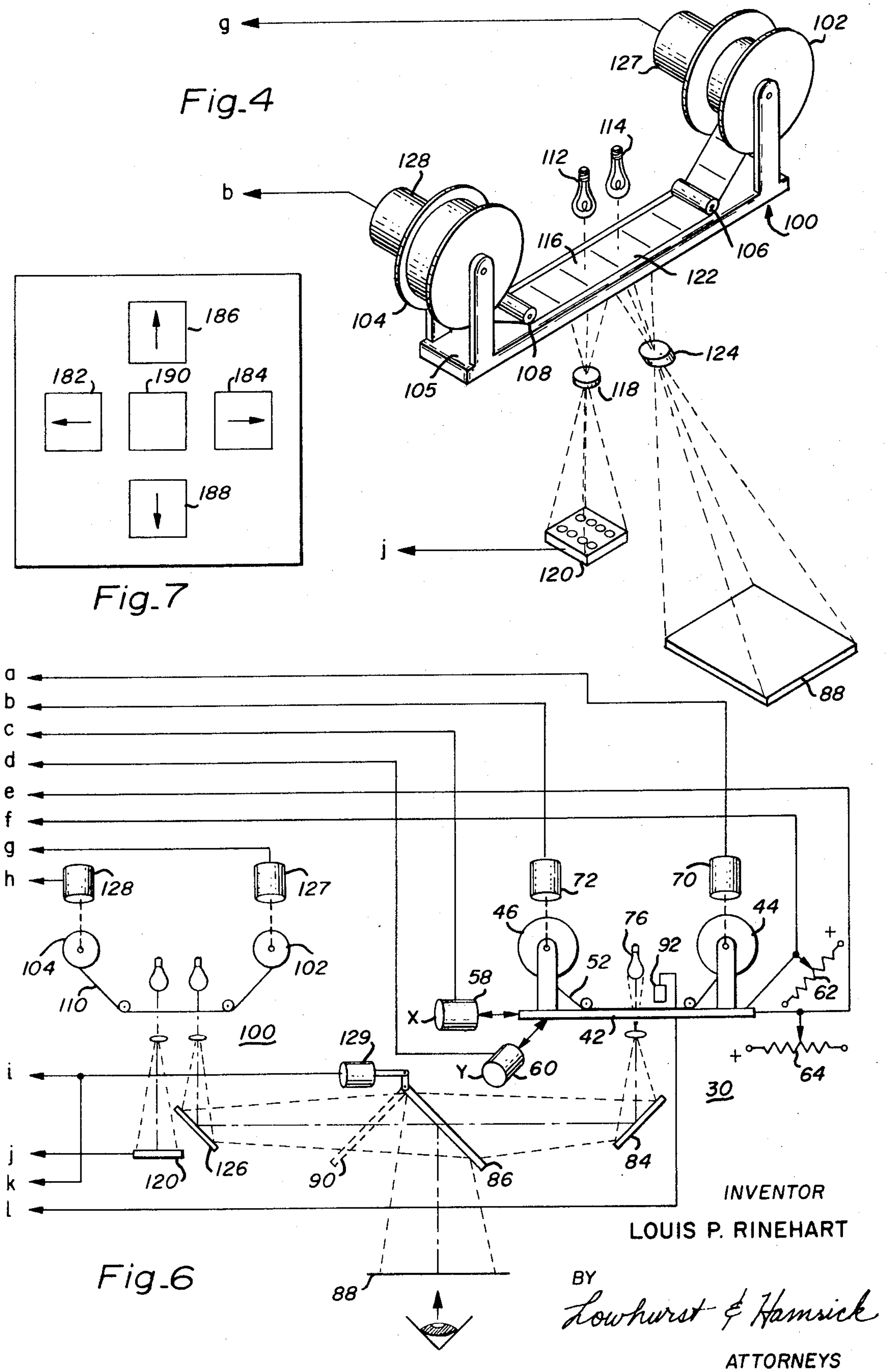
FIG. 4 is an illustration of an update film transport and image projection mechanism in accordance with the present invention.
FIG. 6 is a schematic illustration showing the operative interrelationship between the two film transport and projection mechanisms in accordance with the present invention.
FIG. 7 illustrates one embodiment of an override keyboard in accordance with the present invention.

In FIG. 4 an update film transport and image projection mechanism 100 is illustrated. Mechanism 100 includes a pair of film carrying spools 102 and 104, which are rotatably mounted to the base 105 and a pair of guide rollers 106 and 108 across which the filmstrip 110 is passed. Disposed above a pair of frame size apertures (not shown) in base 105 are a pair of light sources 112 and 114 which illuminate adjacent areas of film strip 110 for projection through the apertures. Light from lamp 112 passing through the frame 116, which contains a machine readable code, projects the coded data through a suitable lens system 118 onto an array of photocells 120 which generate frame identifying output signals for transmission to a control system as explained below. Similarly, light from the source 114 passing through frame 122, which contains the data image stored for projection, causes the image contained therein to be projected through a lens system 124 onto reflector 126 and thence onto viewing screen 88. The spools 102 and 104 are driven by suitable motors 127 and 128.

Figure 5:
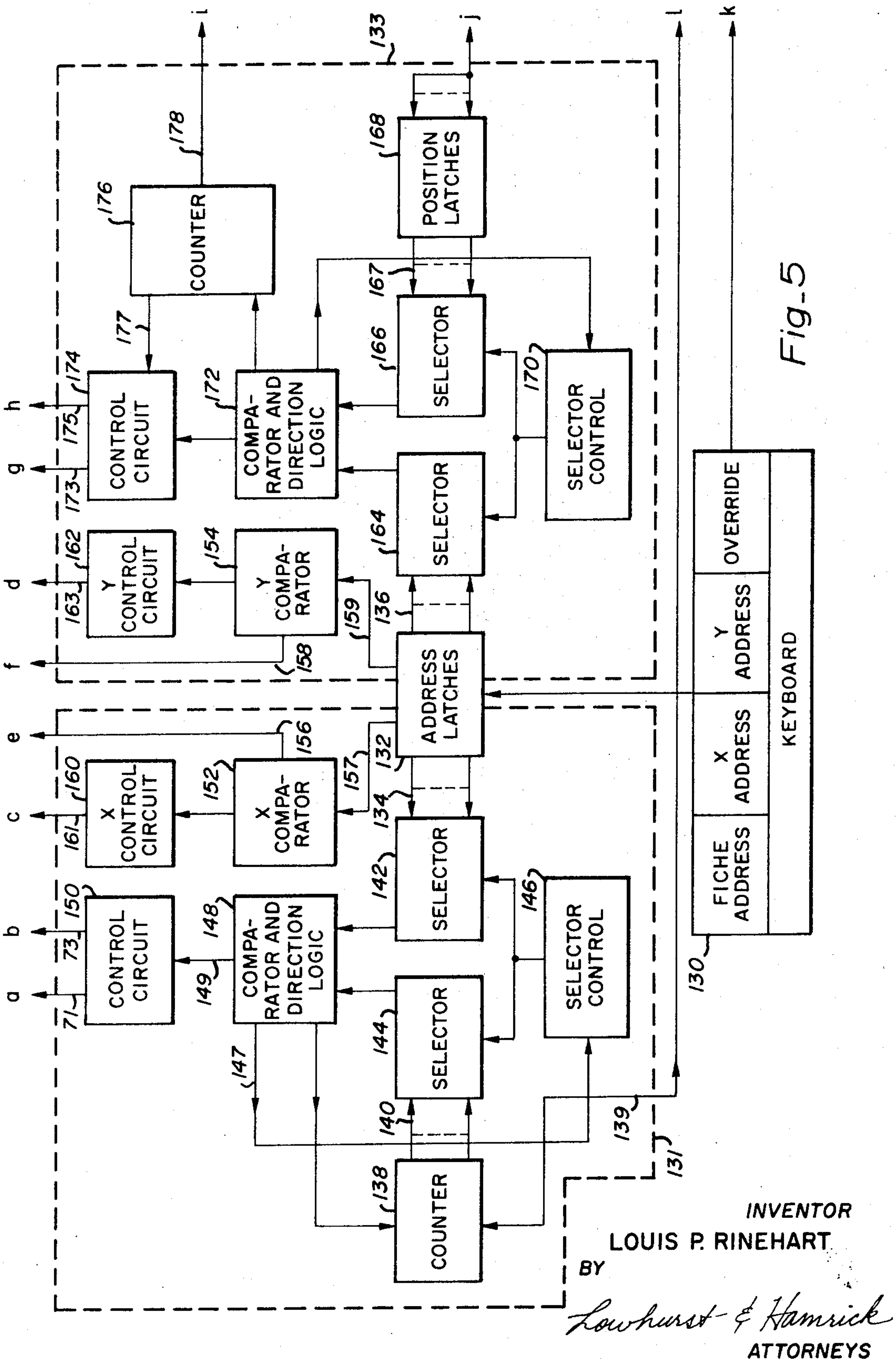
FIG. 5 is a block diagram illustrating the electronic components of an electron control subsystem in accordance with the present invention.

Referring now to FIG. 5, and additionally to FIG. 6, which is a simplified diagram showing the interrelationship between the projection mechanisms 30 and 100, a block diagram of the electrical control system of the present invention and its function will be described. The letters *a* – 1 serve to aid in matching the control lines of FIGS. 5 and 6. The electrical control system generally includes an interface unit in the form of a keyboard 130, a storage film control unit 131, and an update film control unit 133. Since the control subsystem is primarily designed as a means for locating and displaying a selected frame of stored data, an interface is required for converting an operator insertable numerical address into machine readable language. The interface may, for example, take the form of a keyboard 130 into which the operator can input the numerical address of a particular frame of stored data so that it may be located and displayed on screen 88. It will, of course, be understood that the keyboard 130 could likewise be a programmed computer or computer interface for providing automatic insertion of search addresses.

In the preferred embodiment, however, keyboard 100 includes a standard ten key keyboard into which the operator inserts a set of numbers uniquely identifying one of the frames of data on the storage filmstrip and possibly one of the frames on the update filmstrip. For example, in accordance with one address scheme, the first three numbers punched into the machine might identify a particular fiche, with the following two numbers identifying the column location (the X address) of the particular frame within the selected fiche, and the next two numbers identifying the row location (the Y address) of the particular frame selected. In addition, keyboard 130 may also include a clearing button (not shown) and an override button, the operation of which will be explained below.

Responsive to keyboard 130 is a set of address latches 132 which output onto lines 134 and 136 respectively, the digital equivalents of the address keyed into keyboard 130. At the same time that the address signal is generated on lines 134 and 136, a counter 138, responsive to signals received over line 139 and corresponding to the registration marks 94 (FIG. 3) on storage film 52, provides film position signals on lines 140. A pair of selectors 142 and 144, responsive to a selector control unit 146, sample in declining order the most significant digits on lines 134 and 140 and input these signals into a comparator and direction logic means 148 which generates output signals on lines 147 and 149 for controlling selector control unit 146 and a motor control circuit 150 which drives motors 70 and 72 via the lines 71 and 73.

Also responsive to latches 132 are "X" and "Y" comparators 152 and 154 which compare the input signals on lines 156 and 158, from position signal generators 62 and 64 respectively, to the latch output signals appearing on lines 157 and 159. An "X" control circuit 160 and a "Y" comparator 154, respectively, and generate signals on lines 161 and 163 for controlling the X-axis actuator 58 and Y-axis actuator 60 respectively. The signals thus transmitted over lines 71, 139 and 156 thus serve to control the operation storage film transport mechanism 30.

In order to provide control of update film transport mechanism 100, a similar set of components including selectors 164 and 166, position latches 168, selector control unit 170, comparator and direction logic means 172, and control circuit 174, are provided. Depending upon whether the output signals on lines 167 from latches 168 match the address signals on lines 136, control circuit 174 will generate motor control signals on lines 173 and 175 for driving the motors 127 and 128, respectively. Since only a limited number of image frames corresponding to the possible addresses will appear on update film 110, control circuit 174 will cause film 110 to oscillate between the next higher and next lower numbered frames which appear on the update filmstrip. In order to terminate the oscillation between frames, a counter 176 is provided which, upon sensing two to three oscillations, for example, will generate an output signal on line 177, for terminating operation of control circuit 174, and will also generate on line 178, a mirror selection signal for controlling a display selector mirror which will be described below.

In operation, as an address number is punched into keyboard 130, electrical signals are developed in binary coded form corresponding to the address numbers and fed into address latch unit 132 wherein they are retained until cleared. The signals stored in latch unit 132 are simultaneously output onto lines 134 and 136 which are selectively interrogated by selectors 142 and 164, respectively, in response to control signals received from selector control units 146 and 170. The output of selector 142 is fed into comparator 148 along with the output from selector 144 which selectively samples the output signals on the output lines 140 from counter 138. Counter 138, in response to the output of detector 92, generates on lines 140 a set of signals which identify the particular fiche that is positioned between rollers 48 and 50 (FIG. 3) of film transport platform 42 at any given time. Although the preferred embodiment utilizes simple registration marks and a counter responsive thereto to provide a continuous count and thus an indication of which fiche is in the display position it will be appreiated that other position identifying systems could likewise be used so long as they develop a suitable input for selector 144.

Selectors 142 and 144, in response to signals from selector control unit 146, select first the most significant digit of the fiche address date input thereto from latches 142 and counter 138 respectively, and input these signals into comparator 148. If comparator 148 indicates coincidence between the two signals, a signal is generated for input to control unit 146 causing selectors 142 and 144 to input the next most significant digit into comparator 148 for comparison, and so forth, so long as the signals on lines 140 are found identical to the signals on lines 134. However, if comparator 148 does not find coincidence between the signals input thereto, it will generate a signal for input to control circuit 150 which will cause it to energize one of the motors 70 and 72 to drive filmstrip 52 in the direction required to position the addressed fiche beneath lamp 76. As film 52 is driven from one spool to the other, detector 92 senses the registration marks opposite each fiche and develops signals for input into counter 138. When the proper fiche is located and coincidence is detected by comparator 148, control circuit 150 is de-energized and selector control 146 causes selectors 142 and 144 to input the next most significant digit into comparator 148. This sequence is repeated for each digit of the fiche address signal until the proper fiche is positioned for display.

During the time that filmstrip 52 is being driven from one spool to the other to locate the proper fiche, the "X" and "Y" address signals contained in latches 132 are input into "X" and "Y" comparators 152 and 154, respectively. These signals are then compared with the signals received from X-axis and Y-axis potentiometers 64 and 62, respectively, and the results of the comparisons are fed into "X" and "Y" control circuits 160 and 162 which generate output signals for driving the platform positioning motors 58 and 60. Note that comparator 152 must be capable of comparing the analog signal on line 156 to the digital signal on line 157 or else means must be provided for converting one of the signals into the other form. Thus, responsive to a given address input into keyboard 130, a particular frame of data will be selected and positioned for projection onto the display screen 88.

Simultaneously with the above described operation, update film 110 is also scanned to locate a frame corresponding to the input address number. As in the storage film selection subsystem described above, selector 164 interrogates the address responsive outputs on lines 136 and selector 166 interrogates the position responsive outputs on lines 167. Since the indicia appearing opposite each frame on update film 110 contains the full address of that particular frame rather than being simply a registration mark as on storage film 52, no counter is required and instead position latches 168, responsive to the output signals generated by the array of photocells 120, develop the required signals for input to selector 166 on lines 167.

As in the previously described storage film control portion of the system, selector control unit 170 causes selectors 164 and 166 to input signals corresponding to the most significant digits into comparator 172 which in turn generates a comparison signal for input into control circuit 174. Responsive thereto control circuit 174 generates drive signals for driving the motors 146 and 148 to locate the selected frame. And, as in the storage film control operation, upon coincidence of the most significant digit, selector control 170 is again actuated by an output signal from comparator 172 and causes selectors 164 and 166 to input the next most significant digit into comparator 172, and so forth, until the desired frame on update film 110 is located.

However, since update film 110 only contains frames corresponding to the frames of storage film 52 which have been changed, means must be provided for discontinuing the search when it is determined that no update frame corresponding to the input address exits. In the illustrated embodiment, this is accomplished by positioning each of the frames 122 in numerical order on film 110 and then programming the control circuitry 174 to drive the film in the direction of the address number inserted into keyboard 130 until the address number is passed. Once the frame is passed, the film is quickly stopped and returned to the desired frame. If no such address number appears on update film 110, control circuit 174 will cause the tape to oscillate between the next highest numbered frame and the next lower numbered frame. In order to discontinue the searching operation when such oscillation occurs, counter 176 counts the number of oscillations and, after some predetermined number of oscillations (3, for example,) suitable to insure the nonexistence of the sought-for frame, generates a disable signal for input to control circuit 174. At the same time, counter 176 generates an output signal on line 178 for energizing the solenoid 129 to flip mirror 86 (FIG. 6) into position 90 to project the image from storage film 52 onto the display screen 88.

On the other hand, if there is an update frame corresponding to the address input to keyboard 110, solenoid 129 will not be energized and the update frame only will be projected onto display screen 88. It being recognized that one might wish to display the original data as well as the updated data for purposes of comparison, or otherwise, an override button is also provided on keyboard 110 for energizing solenoid 129 to allow projection of the old data onto screen 88. Although screen 88 is illustrated as being merely a visual display screen, it is to be understood that it may alternatively be the face of a television camera tube, a facsimilie reproduction scanner or any other similar display or image transmission medium.

As an additional modification of the simplified system disclosed above, keyboard 130 may also include four additional buttons 182 – 188 which surround the override button 190, as shown in FIG. 7. These buttons enable the operator to advance the position of the fiche one frame at a time in any direction. For example, if the operator were to be viewing a particular frame and he wished to look at the frame immediately preceding it, he would punch button 182 which would change the input to address latches 132 to a number corresponding to the previous frame, the control circuitry would then accordingly, cause the appropriate repositioning of platform 42, and thus storage film 52, and the desired previous frame would be displayed. If he then wished to return the original frame into view, the operator would push button 184, which would again change the number stored in latches 132 back to their original number causing the original frame to be displayed. Likewise, a subsequent depression of button 184 would cause the next higher numbered frame to be displayed and another push of button 184 would cause the next higher numbered frame to be displayed and so forth. Similarly, by depressing buttons 186 and 188, the viewer could selectively view the frame immediately above or below the initially addressed frame.

Since the output of buttons 182 – 188 is fed directly into address latches 132, it will be noted that not only is the storage film shifted in position but so also is update film 100 repositioned where appropriate. Thus, where there is an update frame on film 110, it will be preferentially displayed but, in each case, the override button 190 can be used to override the control system and display the old data.

It will, of course, also be appreciated that the invention is not limited to the particular encoding scheme, film transport mechanism embodiments or control circuitry disclosed above since it is contemplated that one skilled in the art can readily provide many modifications or substitutional changes to the preferred embodiment. For example, instead of providing an array of separated fiches on the storage film, it may be found more advantageous for certain applications to dispose each fiche immediately adjacent one another (in effect eliminating the fiche grouping arrangement) and to provide a registration mark or marks opposite each column, or each 5 columns, etc., so that the control circuit 150 directly selects the row containing the desired frame, thus eliminating the need for the "X" control circuit 160 and "X" comparator 152. And similarly, it may be found more suitable for some applications to position the identifying indicia on update film 110 to the side of each frame instead of inbetween adjacent frames. Furthermore, any of the other electrical and mechanical structure may be modified to suit particular applications without departing from the invention. These and other mechanical and electrical variations of the present invention will no doubt be apparent to those skilled in the art after having read the foregoing disclosure and it is therefore to be understood that the appended claims are to be interpreted as covering not only the apparatus actually described but also all modifications thereof which fall within the true spirit and scope of the invention.

What is claimed is:

1. A microfilm reader system comprising:

a first filmstrip containing a plurality of photographically stored original images;

means for generating a signal of an address;

first film transport means operative responsive to said address signal to select and position for optical projection a particular one of said original images from of said film strip;

a second, continuous and longitudinally movable, filmstrip containing a plurality of photographically stored update images;

means responsive to said address signal, including second filmstrip transport means for scanning said second filmstrip to locate and position for optical projection any update image thereon corresponding to said address;

means for optically projecting at least one of said positioned original and update images;

display means including a display screen for displaying said optically projected image;

means for determining the simultaneous presence of said one original image and said update image at their positions for optical projection; and selectively positionable reflector means operative responsive to said determining means to selectively reflect only one of said projected original and update images onto said display screen.

2. A microfilm reader system as recited in claim 1 wherein said first filmstrip further contains first indicator means and said first transport means includes first sensor means for detecting said first indicator means and providing first filmstrip position signals.

3. A microfilm reader system as recited in claim 2 wherein said second filmstrip further contains second indicator means, and said second transport means includes a second sensor means for detecting said second indicator means and providing second filmstrip position signals.

4. A microfilm reader system as recited in claim 3 wherein said determining means is operative responsive to said first and second filmstrip position signals.

5. A microfilm reader system as recited in claim 1 wherein said optical projection means includes a first source of illumination for projecting said one original image onto said display means, and film positioning means responsive to said address signal operative to cause selective bidirectional movement of said first filmstrip relative to said first source of illumination.

6. A microfilm reader system as recited in claim 5 wherein said projection means includes a second source of illumination for projecting said update image onto said display means, said second transport being operative to cause selective movement of said second filmstrip relative to said second source of illumination.

7. A microfilm reader system as recited in claim 1 wherein said second filmstrip further contains second indicator means and said second transport means includes second sensor means for detecting said second indicator means and providing second filmstrip position signals.

* * * * *